MULTI-FUNCTION APPARATUS FOR TELEVISION RECEIVERS

Filed Jan. 25, 1956

INVENTOR.
JACK "E" WILCOX
BY
Dean V. Hazeltine
ATTORNEY 2,877,299

MULTI-FUNCTION APPARATUS FOR TELEVISION RECEIVERS

Jack "E" Wilcox, Levittown, Pa., assignor to Philco Corporation, Philadelphia, Pa., a corporation of Pennsylvania Application January 25, 1956, Serial No. 561,311

9 Claims. (Cl. 178—7.3)

Figure 1:
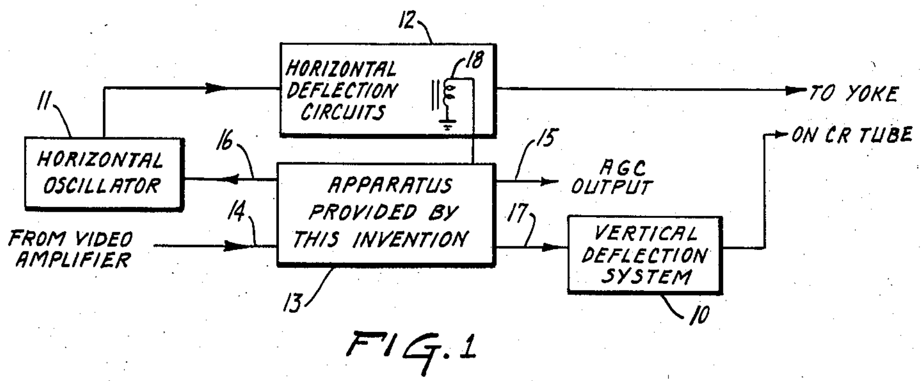

This invention relates to television receivers, and more particularly to circuits and devices in such receivers for performing various functions in response to the incoming signal having video and sync components.

The essential components and the operation of a conventional television receiver are well understood by those skilled in the art, and a detailed discussion thereof is unnecessary. For the present purpose, it suffices to note that among the various functions performed by the components and circuits of such a receiver are separation of sync signals, horizontal phase detection, and production of an automatic gain control (AGC) voltage. Of course, simplification without objectionable sacrifice of performance has always been a principal objective in the television receiver art, but with respect to the three functions above noted it has been necessary heretofore to employ at least two tubes and associated circuitry.

One object of the present invention is to achieve desirable simplification in a television receiver, without adversely affecting the performance of the receiver.

Another object of the invention is to provide an arrangement by which horizontal phase detection and production of an AGC voltage are achieved by means of a single tube and associated circuitry.

A further object of the invention is to provide an arrangement by which all three of the functions above noted are achieved by means of a single tube and associated circuitry.

A feature of this invention is the utilization of a beam deflection tube to detect the phase relation between the horizontal sync pulses and pulses derived from the horizontal deflection system.

Another feature of this invention is the utilization of a beam deflection tube to effect both gated AGC action and horizontal phase detection in response to the horizontal sync pulses.

Another feature of this invention is the utilization of the same tube for separation of the vertical sync signal.

In the preferred embodiment of this invention, reference pulses produced in the horizontal deflection system are utilized both to enable conduction of the beam deflection tube and to effect deflection of the beam therein, and the sync pulses are caused to render the tube conductive. Preferably, the reference pulses employed are the flyback pulses produced during operation of the conventional horizontal deflection system. In operation, the electron beam of the beam deflection tube is initially directed for AGC action, and during the flyback pulse the beam is deflected thereby to a position for horizontal phase detection and synchronization of the horizontal oscillator. The separation of the vertical sync signal is effected through the medium of integrating means connected to an auxiliary grid of the beam deflection tube. Thus, in accordance with this invention, the horizontal sync pulses are utilized as a medium of automatic gain control and are also utilized to synchronize the horizontal oscillator in correct phase relation to the flyback pulses which are caused to serve as phase reference pulses. At the same time, in the preferred embodiment, the separation of the vertical sync signal is performed as a third function of the beam deflection tube.

Figure 2:
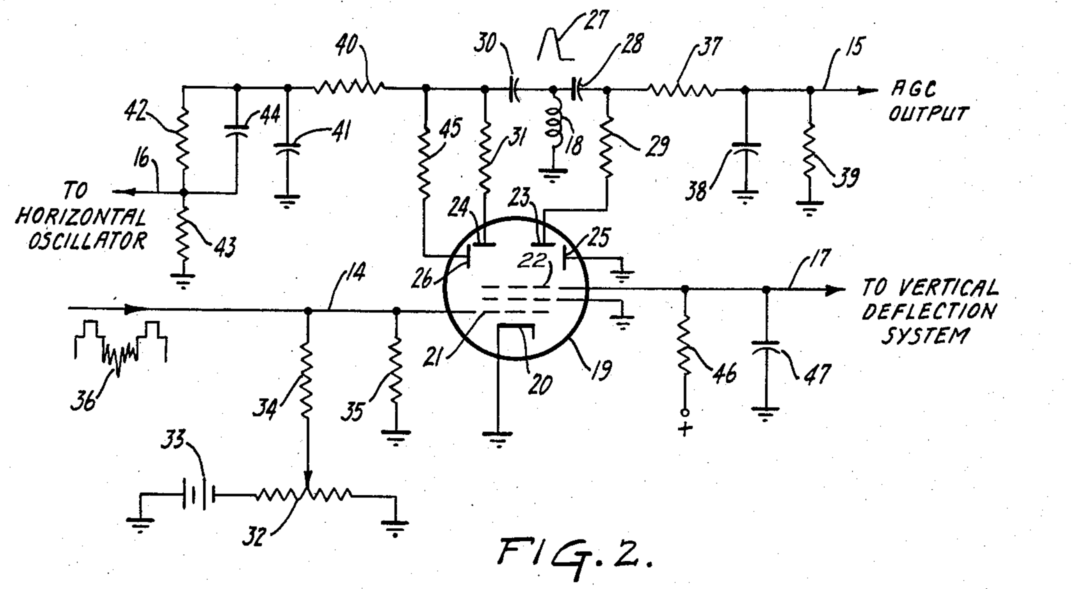
Figure 3:
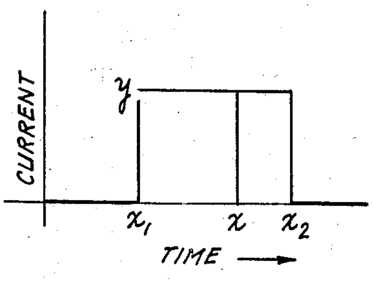

The invention may be fully understood from the following detailed description with reference to the accompanying drawing wherein Fig. 1 is a block diagram of the portion of a television receiver with which the present invention is concerned;

Fig. 2 is a diagrammatic illustration of a preferred embodiment of the apparatus provided by this invention; and Fig. 3 in an idealized representation of the current waveform in the beam deflection tube employed.

Referring first to Fig. 1, block 10 represents the conventional vertical deflection system, block 11 represents the conventional horizontal oscillator, and block 12 represents the conventional horizontal deflection circuits connected to the output of the horizontal oscillator. As is well known, the horizontal deflection circuits include a so-called flyback transformer in which a flyback pulse is produced during horizontal retrace. Block 13 represents apparatus provided by this invention, presently to be described.

The incoming composite signal, having video and sync components, is supplied from the video amplifier to the apparatus 13 at 14. The apparatus 13 performs the three functions hereinbefore mentioned. It produces an AGC voltage which appears at 15; it produces a control signal for the horizontal oscillator, which signal appears at 16; and it effects separation of the vertical sync signal which appears at 17. As previously mentioned, flyback pulses from the horizontal deflection circuits are utilized in the apparatus provided by this invention, such pulses being derived from a winding 18 on the flyback transformer.

Referring now to Fig. 2, there is shown the preferred form of the apparatus provided by this invention. This apparatus comprises a beam deflection tube 19 having a cathode 20, a control grid 21, an auxiliary grid 22, two anodes 23 and 24 arranged so that either may be impinged by the electron beam from said cathode according to the direction of the beam, and two deflector electrodes 25 and 26 associated respectively with said anodes to control the direction of said beam. It will be noted that tube 19 is a dual pentode having two anodes and the associated deflector electrodes.

The flyback pulses, one of which is shown at 27, are supplied from winding 18 to anode 23 through capacitor 28 and resistor 29, and are also supplied to anode 24 through capacitor 30 and resistor 31. Since winding 18 is the only source of voltage supply for the anodes 23 and 24, the flyback pulses enable operation of tube 19 only during occurrence of said pulses.

A negative bias is applied to the control grid 21 of tube 19 from potentiometer 32 whose ungrounded end is connected to a source of negative voltage as represented by battery 33. The adjustable arm of potentiometer 32 is connected through resistor 34 to the signal input conductor 14. A grid resistor 35 is connected between conductor 14 and ground.

The incoming composite signal, having video and sync components as represented at 36, is supplied from the video amplifier over conductor 14 to the control grid 21 of tube 19. The bias level of grid 21 is adjusted to correspond substantially to the blanking level of the signal, so that tube 19 is rendered conductive only by sync components of the signal. Moreover, as stated above, the tube can be rendered conductive only during the flyback pulses.

Anode 23 is the AGC anode, and this anode is connected through resistor 29 to an integrating network comprising resistor 37, capacitor 38 and resistor 39. Intermittent impingement of the electron beam on anode 23 produces pulses which are integrated to produce an AGC voltage between conductor 15 and ground. This voltage is employed in the usual manner to control the gain of the receiver.

Anode 24 is the phase detector anode, and this anode is connected through resistor 31 to an integrating network comprising resistors 40, 42 and 43 and capacitors 41 and 44. Intermittent impingement of the electron beam on anode 24 produces pulses which are integrated to produce the signal for controlling the horizontal oscillator. This signal is derived from across resistor 43 by way of the conductor 16.

It will be noted that deflector electrode 25 is grounded, while deflector electrode 26 is connected through resistor 45 to capacitor 30 and also to resistor 40. Normally a negative voltage is applied to deflector electrode 26 due to the charge developed in capacitor 41, and consequently when tube 19 is rendered conductive, the electron beam initially is directed to anode 23. However, in operation the flyback pulse 27 is applied to the deflecting electrode 26, as well as to the two anodes, and at some time during the flyback pulse, the electron beam is deflected so as to be directed to anode 24.

As previously indicated, the vertical sync component of the input signal is derived by way of the auxiliary grid 22 of tube 19. A source of positive voltage is connected to this grid through resistor 46, and a capacitor 47 is connected between conductor 17 and ground. Derivation of the vertical sync component is effected by integration, and as indicated in Fig. 1, this component is supplied over conductor 17 to the vertical deflection system.

Of particular interest is the fact this invention utilizes the horizontal sync pulses both for AGC and for horizontal phase detection. The operation involving the dual functioning of tube 19 for these purposes may best be understood with the aid of Fig. 3 which shows the idealized current waveform in tube 19 and the time division between AGC and horizontal phase detection. The object is to effect AGC action according to the amplitude of the horizontal sync pulses and to effect control of the horizontal oscillator according to the phase relation between said pulses and the flyback pulses. As will be seen from the following discussion, each flyback pulse determines the time at which the electron beam in tube 19 is effectively switched from anode 23 to anode 24, and this is a measure of the phase relation between the horizontal sync pulse and the flyback pulse.

Considering the operation with reference to Figs. 2 and 3, when tube 19 starts to conduct at the leading edge of a horizontal sync pulse, the voltage between the deflector electrodes 25 and 26 directs the electron beam to the AGC anode 23. At some time during the sync pulse, the positive flyback pulse effectively switches the beam current to the phase detector anode 24. More particularly, the flyback pulse is applied through resistor 45 to deflector electrode 26, and at some point on the flyback pulse the positive voltage on electrode 26 is sufficient to deflect the beam to anode 24. The voltage level at which this occurs is determined by the characteristics of tube 19 and also by the integrating action of the resistance-capacitance combination consisting of resistor 45 and the capacity of electrode 26 with respect to ground. These factors, therefore, determine the point on the flyback pulse at which the switching action occurs, but the time at which the switching action occurs in relation to the sync pulse is determined by the phase relation between the sync pulse and the flyback pulse.

Referring to Fig. 3, the time interval between $x_1$ and $x_2$ represents the total "on" time of tube 19 as determined by the time coincidence of a particular sync pulse and the corresponding flyback pulse. The current amplitude $y$ is determined by the amplitude of the sync pulse. Line $x$ represents the instant at which the electron beam is switched from anode 23 to anode 24, and since this is determined by the flyback pulse, the position of line $x$ within the rectangle representing current flow is dependent on the phase relation between the sync pulse and the flyback pulse.

Thus line $x$ represents a time division of the total current pulse into two pulses represented by the two adjacent rectangles. The left hand pulse is supplied to the AGC circuit, while the right hand pulse is supplied to the phase detection circuit. The two rectangles thus represent energy supplied to the two circuits. In order that the energy supplied to the phase detection circuit shall be a function mainly of the phase relation between the sync pulse and the flyback pulse, and not of the amplitude of the sync pulse, the right hand rectangle should be of substantially smaller width than height. Then the area of the rectangle, representing energy, will be determined mainly by the position of line $x$. This condition is readily attainable in practice.

While variation of the position of line $x$ with changes in phase relation between the sync pulses and the flyback pulses will cause some variation percentage-wise of the area of the left hand rectangle, which represents energy supplied to the AGC circuit, this rectangle is of relatively large area and therefore will not be much affected by changes of line $x$. In practice the horizontal oscillator is quite stable and therefore the changes of line $x$ are quite small. These small changes have little effect upon the area of the left hand rectangle and therefore do not appreciably affect the AGC action, but they cause substantial variations percentage-wise of the area of the right hand rectangle and therefore effect the desired phase detection. On the other hand, substantial variations of $y$ cause substantial variations of the area of the left hand rectangle and therefore effect the desired AGC action.

By way of example only, in one physical embodiment of the apparatus shown in Fig. 2, tube 19 is a 6AR8 tube, and the circuit elements have values as follows:

| | | |
|---|---|---|
| Capacitor **28** | microfarads | .01 |
| Resistor **29** | ohms | 47,000 |
| Capacitor **30** | microfarads | .01 |
| Resistor **31** | ohms | 47,000 |
| Resistor **34** | do | 100,000 |
| Resistor **35** | megohms | 1 |
| Resistor **37** | ohms | 100,000 |
| Capacitor **38** | microfarads | .22 |
| Resistor **39** | megohms | 1 |
| Resistor **40** | ohms | 100,000 |
| Capacitor **41** | microfarads | .01 |
| Resistor **42** | megohms | 2.2 |
| Resistor **43** | ohms | 82,000 |
| Capacitor **44** | microfarads | .01 |
| Resistor **45** | ohms | 56,000 |

The above-described embodiment of the invention has been employed experimentally in a television receiver which was operated over a range of signal levels from 10 to 10,000 microvolts. The peak amplitude of the flyback pulses was 460 volts. The horizontal frequency control was adjusted to sync the picture on the 10 microvolt signal and did not require readjustment with changes in signal level. The experimental tests showed that the system operates entirely satisfactorily.

In practice, it is preferred to employ a single tube to perform the three functions hereinbefore mentioned. However, the invention contemplates the use of a beam deflection tube to effect gated AGC and horizontal phase detection irrespective of the manner in which vertical sync separation is achieved.

Further still, the invention contemplates broadly the use of a beam deflection tube to detect the phase relation between hte horizontal sync pulses and pulses derived from the horizontal deflection system. Thus, from the standpoint of phase detection alone, the system illustrated and described is novelly characterized in that pulses are produced by beam deflection whose energy content is dependent upon the phase relation between the sync pulses and the flyback pulses, and the produced pulses are integrated to produce the desired control voltage.

While a preferred embodiment of the invention has been illustrated and described, it is to be understood that the invention is not limited thereto but contemplates such modifications and further embodiments as may occur to those skilled in the art.

I claim:

1. In a television receiver employing a horizontal deflection system having a horizontal oscillator to be controlled by a horizontal sync signal, in which deflection system recurrent positive pulses are produced which may serve as phase reference pulses, the receiver also employing automatic gain control means, apparatus for supplying a control signal to said oscillator and for producing the automatic gain control voltage, comprising: a beam deflection tube having a cathode, a control grid, two anodes arranged so that either may be impinged by the electron beam from said cathode according to the direction of the beam, and means for deflecting the beam between said anodes; means for supplying said pulses to said anodes so as to enable operation of said tube only during occurrence of said pulses; means for supplying said sync signal to said control grid to effect conduction in said tube during the occurrence of said sync signal; means for causing deflection of said beam during each of said pulses; means responsive to the beam impingement on one of said anodes for producing an automatic gain control voltage; and means responsive to the beam impingement on the other of said anodes for supplying a control signal to said oscillator.

2. A television receiver according to claim 1, including means for biasing said deflecting means so that initially said beam is directed to said one anode, and means for supplying said pulses to the deflecting means to effect deflection of the beam to said other anode during each pulse.

3. In a television receiver employing a vertical deflection system to be controlled by a vertical sync signal and a horizontal oscillator to be controlled by a horizontal sync signal, in which horizontal deflection system recurrent positive pulses are produced which may serve as phase reference pulses, the receiver also employing automatic gain control means, apparatus for effecting vertical sync separation, for supplying a control signal to said oscillator and for producing the automatic gain control voltage, comprising: a beam deflection tube having a cathode, a control grid, an auxiliary grid, two anodes arranged so that either may be impinged by the electron beam from said cathode according to the direction of the beam, and two deflector electrodes associated respectively with said anodes to control the direction of said beam; means for supplying said pulses to said anodes so as to enable operation of said tube only during occurrence of said pulses; means for supplying said sync signal to said control grid to effect conduction in said tube during the occurrence of said horizontal sync signal; integrating means connected to said auixiliary grid to derive the vertical sync signal; means including said deflector electrodes for causing each of said pulses to effect successive impingement of said beam on said anodes; means responsive to the beam impingement on one of said anodes for producing an automatic gain control voltage; and means responsive to the beam impingement on the other of said anodes for supplying a control signal to said oscillator.

4. In a television receiver employing a horizontal deflection system which includes an oscillator to be controlled by a horizontal sync signal and in which recurrent flyback pulses are produced, and also employing automatic gain control means, apparatus for supplying a control signal to said oscillator and for producing the automatic gain control voltage, comprising: a beam deflection tube having a cathode, a control grid, two anodes arranged so that either may be impinged by the electron beam from said cathode according to the direction of the beam, and two deflector electrodes associated respectively with said anodes to control the direction of said beam; means for supplying said flyback pulses to said anodes so as to enable operation of said tube only during occurrence of said pulses; means for supplying said sync signal to said control grid to effect conduction in said tube during the occurrence of said horizontal sync signal; means including said deflector electrodes for initially deflecting said beam to one of said anodes and for causing the flyback pulse to subsequently deflect the beam to the other of said anodes; means connected to said one anode to produce an automatic gain control voltage; and means connected to said other anode to supply a control signal to said oscillator.

5. A television receiver according to claim 4, including means for biasing said deflector electrodes so that initially said beam is directed to said one anode, and means for supplying said pulses to the deflector electrode associated with said other anode so that during occurrence of each pulse the beam is deflected to said other anode.

6. In a television receiver employing a vertical deflection system and a horizontal deflection system which includes an oscillator to be controlled by a horizontal sync signal and in which recurrent flyback pulses are produced, and also employing automatic gain control means, apparatus for effecting vertical sync separation, for supplying a control signal to said oscillator and for producing the automatic gain control voltage, comprising: a beam deflection tube having a cathode, a control grid, an auxiliary grid, two anodes arranged so that either may be impinged by the electron beam from said cathode according to the direction of the beam, and two deflector electrodes associated respectively with said anodes to control the direction of said beam; means for supplying said flyback pulses to said anodes so as to enable operation of said tube only during occurrence of said pulses; means for supplying said sync signal to said control grid to effect conduction in said tube during the occurrence of said horizontal sync signal integrating means connected to said auxiliary grid to derive the vertical sync signal; means including said deflector electrodes for initially deflecting said beam to one of said anodes and for causing the flyback pulse to subsequently deflect the beam to the other of said anodes; means connected to said one anode to produce an automatic gain control voltage; and means connected to said other anode to supply a control signal to said oscillator.

7. In a television receiver employing a vertical deflection system to be controlled by a vertical sync signal and a horizontal deflection system which includes an oscillator to be controlled by a horizontal sync signal and in which recurrent flyback pulses are produced, and also employing automatic gain control means, apparatus for effecting vertical sync separation and production of oscillator control and automatic gain control voltages, comprising: a beam deflection tube having a cathode, a control grid, an auxiliary grid, two anodes arranged so that either may be impinged by the electron beam from said cathode according to the direction of the beam, and two deflector electrodes associated respectively with said anodes to control the direction of said beam; means for supplying said flyback pulses to said anodes so as to enable operation of said tube only during occurrence of said pulses; means for supplying the incoming composite video and sync signal to said control grid; means for applying a negative bias to said control grid such that said tube can be rendered operative only by sync components of said signal; integrating means connected to said auxiliary grid to derive by way of that grid only the vertical sync component of said signal; means including said deflector electrodes for initially deflecting said beam to one of said anodes and for causing the flyback pulse to subsequently deflect the beam to the other of said anodes;

means connected to said one anode to produce an automatic gain control voltage; and means connected to said other anode to supply a control voltage to said oscillator.

8. A television receiver according to claim 7, including means for biasing said deflector electrodes so that initially said beam is directed to said one anode, and means for supplying said pulses to the deflector electrode associated with said other anode so that during occurrence of each pulse the beam is deflected to said other anode.

9. In a television receiver employing a horizontal deflection system having a horizontal oscillator to be controlled by horizontal sync pulses, in which deflection system pulses are produced which are generally time-coincident with said sync pulses, apparatus for controlling said oscillator, comprising: a beam deflection tube having a cathode, a control grid, two anodes arranged so that either may be impinged by the electron beam from said cathode according to the direction of the beam, and electrode means by which the beam may be directed to either anode; means for supplying said sync pulses to said control grid; means for supplying said produced pulses to said anodes and to said electrode means; means for biasing said electrode means to cause initial impingement of the beam on one of said anodes, the beam being deflected to the other anode at a time dependent upon the phase relation between each sync pulse and the corresponding produced pulse; and an integrating circuit connected to said other anode for producing a voltage for control of said oscillator.

References Cited in the file of this patent

FOREIGN PATENTS 706,758 Great Britain ------------ Apr. 7, 1954